(No Model.)

W. M. WALTMAN.
MOLE TRAP.

No. 374,765. Patented Dec. 13, 1887.

Witnesses:
A. Walter Adams
John P. Adams

Inventor:
William M. Waltman

UNITED STATES PATENT OFFICE.

WILLIAM M. WALTMAN, OF BEAN BLOSSOM, INDIANA.

MOLE-TRAP.

SPECIFICATION forming part of Letters Patent No. 374,765, dated December 13, 1887.

Application filed July 23, 1887. Serial No. 245,125. (No model.)

*To all whom it may concern:*

Be it known that I, WILLIAM M. WALTMAN, a citizen of the United States, residing at Bean Blossom, county of Brown, and State of Indiana, have invented certain new and useful Improvements in Mole-Traps, of which the following is a specification.

My invention relates to that class of traps in which a weighted or spring-pressed head is normally supported above the ground by a detent or trigger and provided with spears designed to impale the animal which springs the trap.

The object of the invention is to provide an effective and simple device of this character in which the operating parts shall be concealed and protected from accidental disarrangement.

To this end my invention consists in novel features of construction and combinations, which will be hereinafter described and claimed.

Figure 2:
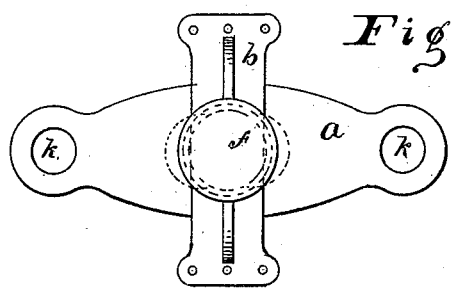
Figure 1:
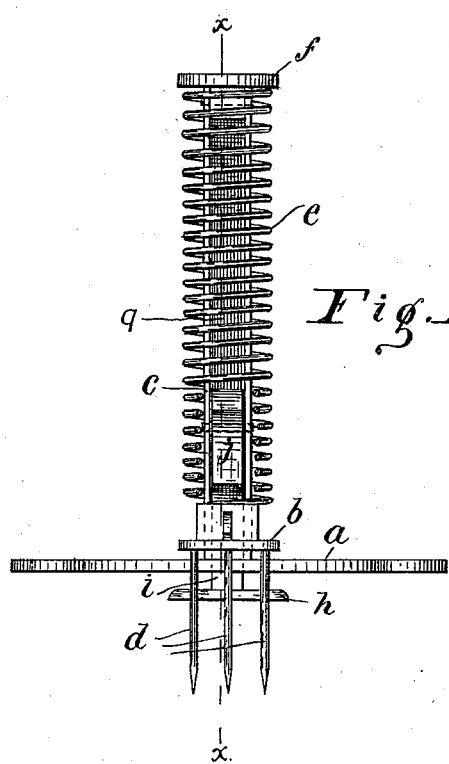
Figure 3:
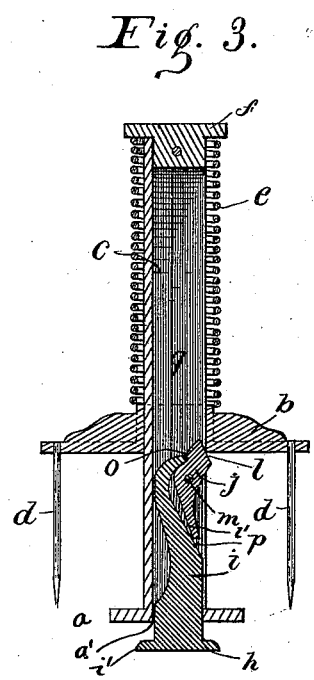

In the accompanying drawings, Figure 1 is a front elevation of my improved trap. Fig. 2 is a plan view, and Fig. 3 is a vertical section on line $x\,x$ of Fig. 1.

Rising vertically from a flat elongated base-plate, $a$, is a standard, $c$, in one side of which is formed a deep groove or channel, $q$. The standard $c$ is provided at top with a flanged head or cap, $f$, secured by a pin, $f'$, or otherwise, and fitted to slide longitudinally on the standard is a head, $b$, provided at each end with a series of long downwardly-extending spears or spikes, $d$. The head $b$ is arranged crosswise of the base $a$, as best shown in Fig. 2, the ends of said head extending beyond the sides of the base, in order that the spears $d$ will clear the base in their descent with the head.

The base $a$ is provided with an opening, $a'$, corresponding in size and shape with the cross-section of the groove $q$, and within this opening and the lower end of the groove is arranged a sliding trigger, $i$, provided at its lower end with an encircling flange, forming a broad flat foot, $h$. The upper end of the trigger is shaped to form an incline, $p$, and a point, $i'$, both facing the open side of the groove $q$, and within the groove, at a suitable distance above the base $a$, is a pivot, $m$, upon which is mounted a dog, $j$, the inclined working-face $l$ of which is adapted to be projected past the outer edges of the groove $q$ and into the path of the sliding head $b$ when the lower or tail end, $l'$, of the dog is carried toward the rear wall of said groove. The dog is provided above the pivot and opposite the inclined face $l$ with a notch, $o$, shaped to receive the point $i'$ of the trigger when the latter occupies its lowermost position, (shown in Fig. 3,) whereby the inclined face $l$ of the dog is maintained in a position to support the sliding head $b$.

Surrounding the standard $c$, and confined between the cap $f$ and the sliding head $b$, is a coiled spring, $e$, the force of which is exerted to thrust the head downward toward the base $a$.

In operation the upper wall of the underground tunnel or passage formed by a mole is to be so gently flattened at one point as not to break said wall. The trap is then set, as shown in Fig. 2, and the base $a$ is securely anchored across said tunnel by means of stakes driven through the openings $k$ in its ends, said stakes passing on each side of the tunnel. In this position it will be seen that there is no liability of the trap being sprung accidentally by the passage near it of moving objects—as fowls or small animals—as the operative parts—to wit, the trigger and the dog—are protected from contact with foreign objects, and the trap can only be sprung by an upward pressure on the trigger to release its point from the notch $o$ of the dog, or by being torn violently from its position, which latter contingency is not apt to arise.

I am aware that it is not new to construct a mole-trap with a spear-carrying head mounted to slide upon a standard and arranged to be forced downwardly by a spring when released by a pivoted dog, which is operated by a trigger sliding within said standard, and this I do not claim. I am not aware, however, that a device so constructed has ever been provided with a pivoted dog adapted to lie entirely within the standard when the trap is sprung, and to project only beneath the head when the trap is set, nor with a trigger which projects only below the base.

Having thus described my invention, what I claim, and desire to secure by Letters Patent, is—

1. In an animal-trap, the combination, with a base, a grooved vertical standard rising therefrom and provided with a cap, a head mounted to slide upon the standard and provided with impalement-spears, and the spring, of a dog pivoted within the groove of the standard near the base, and a trigger arranged to hold the dog in the path of the sliding head or to release the same and spring it within the groove of the standard.

2. In an animal-trap, the combination, substantially as before set forth, of the base, the grooved vertical standard provided with a cap, the sliding head mounted on the standard and provided with impalement-spears, the spiral spring confined between said head and the cap, the trigger mounted to slide within the groove and provided at its upper end with a point, and the dog pivoted to lie entirely within the groove of the standard and provided with a notch to engage the point of the trigger when projected beyond the outer edges of the groove.

3. In an animal-trap, the combination of the base, the standard secured thereto and provided at top with a cap, the head provided with impalement-spears and mounted to slide upon the standard, the spring confined between the head and cap, the trigger mounted to slide within the lower end of the groove, and the dog pivoted to be swung entirely within the groove, or to project therefrom to support the sliding head, the parts being so arranged that the dog will be supported by the trigger in the path of the sliding head when the trap is set, and be swung within the groove when the trap is sprung, substantially as before set forth.

WILLIAM M. WALTMAN.

Witnesses:
J. E. HOPPER,
J. W. DERINGER.